United States Patent [19]

Herr

[11] Patent Number: 4,660,845
[45] Date of Patent: Apr. 28, 1987

[54] ADJUSTABLE STEERING STOP
[75] Inventor: Herbert W. Herr, Waterloo, Iowa
[73] Assignee: Deere & Company, Moline, Ill.
[21] Appl. No.: 848,532
[22] Filed: Apr. 7, 1986
[51] Int. Cl.⁴ .............................................. B62D 5/06
[52] U.S. Cl. .................................. 280/95 R; 180/154;
    180/163; 180/906; 403/113; 403/117
[58] Field of Search ................... 280/771, 95 R, 95 A;
    180/152, 153, 154, 155, 156, 158, 159, 160, 161,
    162, 163, 906; 403/112, 113, 117

[56] References Cited

U.S. PATENT DOCUMENTS

| | | | |
|---|---|---|---|
| 3,981,513 | 9/1976 | Erskine | 280/95 R |
| 4,161,327 | 7/1979 | Honecker | 280/95 R |
| 4,536,003 | 8/1985 | Maurer et al. | 280/95 R |

FOREIGN PATENT DOCUMENTS 2642903  3/1978  Fed. Rep. of Germany .
555764   7/1923  France .................................. 403/113
145666   3/1921  United Kingdom ................. 403/113

OTHER PUBLICATIONS

John Deere Operator's Manual OM-RW21230, pp. 70-23 to 70-26 (no date).

*Primary Examiner*—John J. Love
*Assistant Examiner*—Kenneth R. Rice

[57] ABSTRACT

A stop mechanism for selectively varying the turning angle of an agricultural tractor is disclosed. The stop uses a series of limit tabs, one or more of which may be positioned between two abutments on a knuckle and yoke to provide a number of discrete adjustment points for the turning angle. The tabs are fixed to the steering components, readily movable to a position between the abutments, and semi-permanently attached to the tractor thereby allowing quick adjustment of turning angle without the need for loose parts.

18 Claims, 4 Drawing Figures

ADJUSTABLE STEERING STOP

BACKGROUND OF THE INVENTION

1. Field of the Invention

The present invention relates to adjustably limiting pivotal movement between pivotally connected members. More specifically, this invention relates to an adjustable stop for limiting steering angle on vehicles and, in particular, tractors.

2. Description of the Prior Art

On most vehicles, pivotal movement of the steerable wheels or steering angle is limited in some manner to prevent contact between the wheels and other parts of the vehicle. Preventing contact between the moving wheels and other parts of the vehicle such as the frame or body avoids damage to the vehicle wheels or other parts of the vehicle. For most vehicles, the wheel spacing and tire size remains essentially constant and a permanent stop may be incorporated into the design of the vehicle to limit the steering angle of the steerable wheel and avoid the aforementioned contact. However, in vehicles that have adjustable axles variable tire widths or variable chassis dimensions, a permanent or nonadjustable stop may not prevent vehicle and wheel contact for all tire size or tread width combinations without unduly limiting the steering angle for some combinations. Accordingly, it is necessary to provide adjustable limit stops to allow full use of the available steering angle for different tread width and tire combinations.

Agricultural tractors fall into the class of vehicles wherein adjustment to the steering stops is frequently necessary. Wheel spacing is often varied on such tractors by the use of different rim arrangements or variations in axle width. Variation in wheel spacing are made to accommodate the different spacing between rows of particular crops. In addition, equipment is often temporarily attached to the frames of such tractors in a manner that can limit the clearance for the steerable wheels. Finally, the tire size itself is often changed to suit different tractive conditions. Thus, tractors are usually provided with means for limiting the pivotal movement of the steerable wheels. The need to limit pivotal movement has become increasingly important as the size of the front wheels on tractors have increased with the addition of mechanical front-wheel drive to many such tractors.

Prior art stops typically use a bolt stop to limit steering angle. In these stops, a bolt is threaded into a hole in one of the pivot members of the steering assembly. The bolt extends out of the hole on at least one side and contacts an abutment on an opposing pivot member to limit angular movement between pivot members. Adjustment of the steering angle is provided by turning the bolt in or out of the threaded connection. Different means of locking the bolt at a particular adjustment length are provided, such as a locknut on the bolt. One problem with this method is that a bolt, unless excessively large, may be inadequate to withstand the high compressive forces imposed by the steering system of the large vehicles. More significantly attaining the proper extension of the bolt to suit particular tire and wheel spacing combinations requires knowledge of the necessary bolt length or trial and error adjustment following each change to a new combination. Since a separate stop is usually used for each turning angle direction the stop adjustment must be performed twice for each change in wheel clearance.

Adjustable wheel stops using washers over the section of a bolt extended as a stop or movable blocks bolted to an axle are also known. With the washer system, a specified number of washers are placed over the bolt to set the clearance. Adding washers increases the compressive strength of the stop and prevents failure of the bolt. In the case of blocks, changing the position or thickness of the block sets the turning angle. While either the washer and bolt or block arrangement will increase the strength of the stop, both systems are inconvenient since the retaining bolts must be completely removed to add washers or change the blocks. Furthermore, in the case of washers or blocks of different thickness, the operator has additional loose pieces that must be stored when not in use.

Accordingly, it is an object of this invention to provide an adjustable steering stop that will be capable of handling the high steering loads transmitted to the steerable wheels of a vehicle.

It is a further object of this invention to provide a steering stop that is quickly adjustable to suit a number of specific turning angles.

A yet further objective of this invention is to avoid the use of loose pieces in an adjustable steering stop.

SUMMARY OF THE INVENTION

Accordingly, the present invention is directed to a pivot stop using adjustment tabs, the positioning of which can progressively limit available pivotal movement between pivotally connected members in a pivot assembly.

In a more specific embodiment, the present invention is directed to a steering stop that uses adjustment tabs to alter the available steering angle of a vehicle. More specifically, pivotal movement of the steerable wheels is limited by a first abutment, fixed relative to the vehicle, and a second abutment, which is fixed relative to a wheel support for rotatably supporting a steerable vehicle wheel. The abutment on the wheel support has a line of travel that intersects the first abutment such that contact of the abutments will prevent further pivotal movement of the wheel in the direction causing contact. In order to decrease the allowable pivotal movement between the abutments, one or more stop tabs are provided which can be positioned along the line of travel between the abutments and are relatively fixed to the vehicle. The tabs are provided with means for holding them in a storage position wherein the tabs do not limit the turning angle or in a stop position wherein the tabs limit movement between the abutments.

DESCRIPTION OF THE PREFERRED EMBODIMENT

Figure 1:
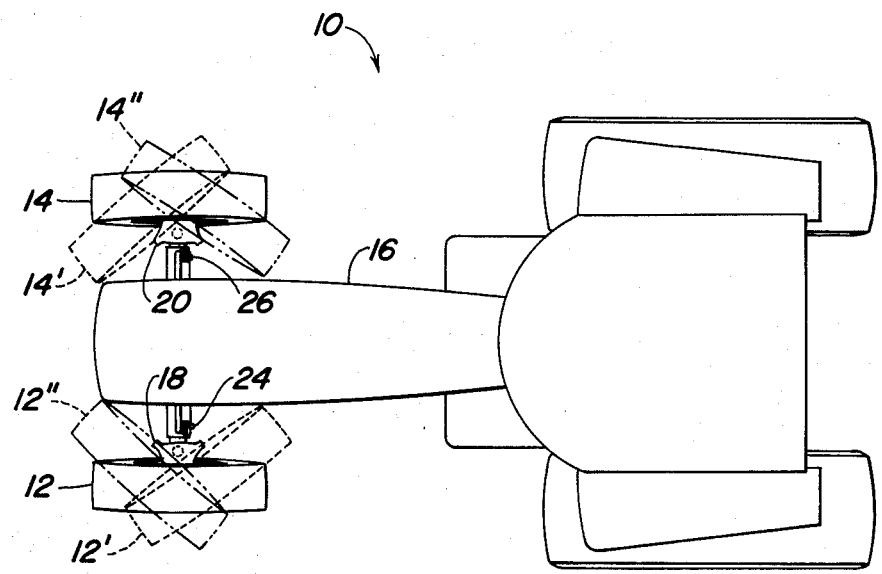
FIG. 1 is a top view of an agricultural tractor having the stop of this invention.

Looking at FIG. 1, there is shown a top view of an agricultural tractor. The tractor has a pair of front wheels 12 and 14 located on the left- and right-hand sides, respectively, of an engine housing 16. Each wheel is rotatably supported, respectively, from right and left knuckle assemblies 18 and 20. Both knuckles serve as first pivot members and are attached to a front axle 21 at opposite yoke ends. In addition, both knuckles are capable of pivotal movement with respect to the vehicle body which, for the purpose of this specification, includes all portions of the vehicle except the steerable wheel and wheel support. The axle has at its opposite ends a pair of yoke attachments 22 and 23 which both serve as second pivot members and pivotally connect to left knuckle 18 and right knuckle 20, respectively. Left and right stop assemblies 24, 26 are associated, respectively, with the left and right knuckle and yoke connections.

Wheels 12 and 14 are shown, by dashed lines, in a left turn position indicated by 12 and 14' and a right turn position indicated by 12" and 14". Wheels 12 and 14 are connected by a tie rod assembly (not shown) such that each wheel undergoes the same angle when making a turn. When the tractor makes a left-hand turn, the left limit stop is used to control movement of the wheels. The limit stop is adjusted such that engine housing 16 is not contacted by the rear portion of the left wheel when in the position indicated by 12' and the forward portion of the right wheel while in a position as indicated by 14'. In a similar fashion, the right stop assembly 26 is used to control movement of the wheels in a right turn maneuver. Thus, the right- and left-hand wheel stops are used to control movement of the steerable wheels in opposite turning maneuvers.

Figure 2:
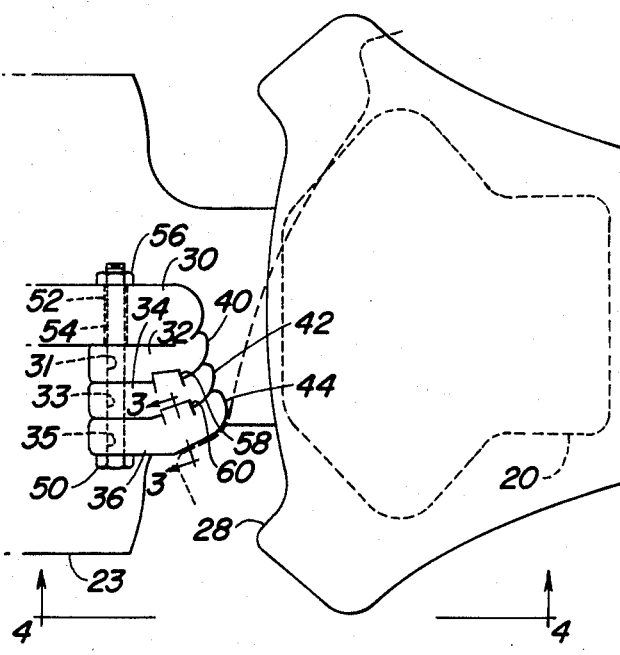
FIG. 2 is an enlarged detail of the stop from FIG. 1.

Looking now in more detail at the stop assembly, FIG. 2 shows an enlarged view of right stop assembly 24. The outer portion of knuckle 20 is flared outward at one end forming abutment 28. Knuckle 20 is pivotally attached to yoke 23 about an axis extending through a point B. Yoke 23 has a large raised rib 30 that forms another abutment on the top of the yoke. As knuckle 20 rotates clockwise around point B, abutment 28 moves along the circular path C on an intersecting course with abutment 30.

Also attached to yoke 23 are three stop tabs, an inner tab 32, a middle tab 34 and an outer tab 36. The stop tabs are attached to the yoke by bolt 50 which passes through a series of holes 31, 33 and 35 at the respective left ends of the inner, middle and outer stop tabs. The size of the holes in each tab permits free rotation of the tab about bolt 50. At the end opposite the hole, each stop tab has a finger portion 40, 42, 44, respectively, which may be positioned across line C. A threaded portion 54 of bolt 50 extends through a threaded hole 52 in yoke abutment 30. Bolt 50 can be tightened in the hole 52 to hold the stop tabs in a selected position. In order to prevent the bolt from coming loose under vibration from the vehicle, the threads of bolt 50 are extended out through the opposite side of the rib and engage a lock nut 56.

Figure 3:
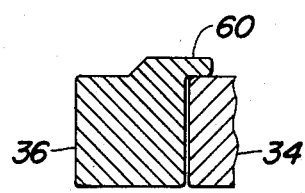
FIG. 3 is a specific detail of the stop tab from FIG. 2.

Extending respectively from middle tab 34 and outer tab 36 are sequencing prongs 58 and 60 when the fingers of the stop tabs are positioned across line C, prong 60 overlaps middle tab 34 and prong 58 overlaps inner tab 32 as shown in FIG. 3. The overlap of prong 60 over middle tab 34 prevents relative clockwise rotation of outer tab 36 past middle tab 34. In a similar manner, prong 58 attached to middle tab 34 prevents relative clockwise rotation of the middle tab past inner tab 32.

Figure 4:
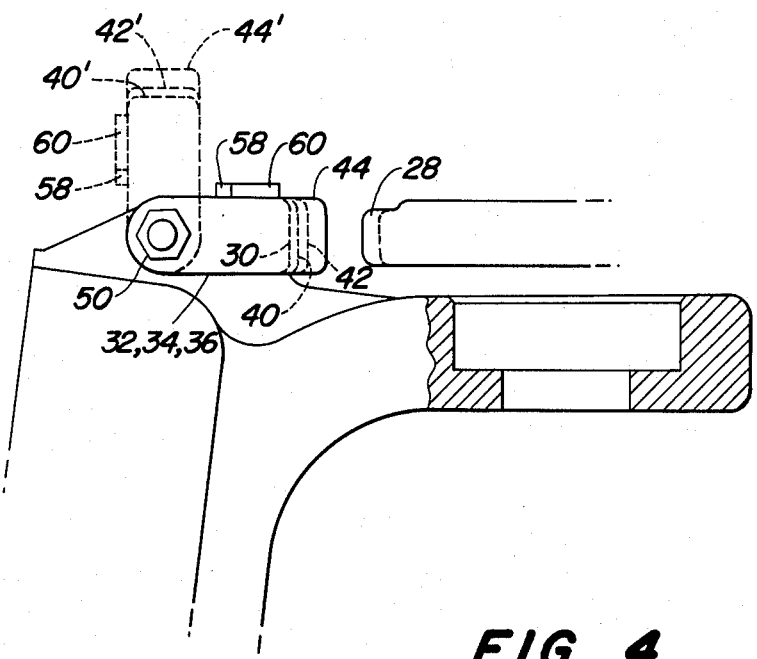
FIG. 4 is a side view of the stop of FIG. 2.

The stop tabs are movable to two positions shown in FIG. 4. One position is a stop position as shown by solid lines wherein the finger portion of the stop tab lies across line C and limits the movement of abutment 28 towards abutment 30. The other position is a storage position as shown by dashed lines in FIG. 4. In the storage position, the finger portion of the tabs have been rotated upward and off the line C so as not to interfere with contact between the two abutments.

The stop as shown, has three tabs for adjusting the relative movement between the knuckle and the yoke. With the three tabs, it is possible to limit the relative turning angle between the knuckle and yoke to four limit positions. The maximum turning angle is provided by moving all three tabs to the storage position as shown in FIG. 4. The tabs are held in this position by the tightening bolt 50 with the locknut as previously described. Bolt 50 provides positive means for holding the tabs in the storage position since movement and vibration of the vehicle could cause the tabs to fall across the path of line C thereby causing an unwanted limitation in the steering angle.

By loosening bolt 50 and rotating the inner tab 32 clockwise so that the finger portion moves from the storage position, indicated as 40' in FIG. 4, to the stop position, i.e., across line C while leaving tabs 34 and 36 with their finger portions in the storage positions, 42' and 44', a first adjustment to the steering angle is achieved. The clockwise rotation of knuckle 13 can be further limited by moving the finger portion of tab 32 from position 42' to position 42. The maximum limitation on steering angle is achieved by rotating tab 36 downward from position 44' to position 44, thus the progressive movement of each tab to the stop position further decreases the permissible turning angle of the knuckle relative to the yoke. The limitation and turning angle introduced by the tabs is controlled by the finger width that is placed along line C. Therefore, the number and amount of adjustments in steering angle within the maximum steering angle permitted by abutments 28 and 30 can be varied by controlling the width of the fingers and the number of tabs.

As mentioned previously, large tractors, or any large vehicle for that matter, are provided with power steering systems capable of generating a large amount of force which is transmitted to the steering components. Consequently, the abutments for limiting steering movement must be of sufficient size and strength to withstand these forces. When tabs are placed in the stop position, these forces are also transmitted to the finger portion of the tab. In order to support the finger portion, loads are transferred in direct compression from abutment 28 to abutment 30 by preventing any gaps between the fingers that are in the stop position. In order to avoid gaps, all fingers inward of the finger contacting abutment 28 are also placed in the stop position. Prongs 58 and 60 prevent a finger from being placed across path C before all inward fingers have been placed in the stop position. If, for example, it was attempted to move middle tab 34 to the stop position while inner tab 32 is still in a storage position, prong 58 would contact tab 32 and cause tab 32 to rotate into the stop position along with tab 34.

It should also be noted that bolt 50 offers a very simple means of securing the tabs into the storage and stop positions. Nevertheless, it is possible to design a detent arrangement that would allow the tabs to be flipped from the storage to the stop position loosening a bolt. Such a detent arrangement is possible by modifying the bolt 50 and abutment 30 to eliminate the threaded portion 52 in the yoke and spring loading the bolt at its end where locknut 56 is now provided to put the bolt in tension. The tabs and abutment could then be provided with suitable recesses and protrusions to keep the tabs in position under the force provided by bolt 50.

Those skilled in the art can appreciate the many modifications and variations that can employed to practice this invention. Accordingly, although this invention has been described in conjunction with a preferred embodiment, the scope of this invention encompasses such variations and modifications and is only limited by the appended claims.

What is claimed is:

1. A pivot stop for adjustably limiting pivotal movement between first and second pivotally connected members of a pivot assembly, said stop comprising a first abutment fixed relative to said first pivot member; a second abutment fixed relative to said second pivot member and having a relative line of travel intersecting said first abutment as said abutments are moved together by relative pivotal movement of said pivot members; two or more movable stop tabs secured to said pivot assembly, each tab being movable between, a storage position wherein said finger is outside the line of travel of said second abutment, and a stop position wherein said stop tab intersects said line of travel of said second abutment; and means for selectively maintaining said tabs in said storage and stops positions.

2. The pivot stop of claim 1 wherein each said abutments are attached to said pivot members.

3. The pivot stop of claim 1 wherein a first step tab is sandwiched between said abutment and a second stop tab said second stop having a prong projecting toward said abutment and engageable with said first tab to prevent movement of said second tab into its stop position unless the first tab also moves into its stop position.

4. A steering angle stop for limiting pivotal movement of a steerable wheel pivotally attached to a vehicle body by a wheel support to which said wheel is rotatably attached, said stop comprising: a first abutment fixed relative to said vehicle body; a second abutment fixed relative to said wheel support and having a line of travel intersecting said first abutment as said second abutment is pivoted with said support toward said first abutment; two or more movable stop tabs secured to said vehicle, each tab having a spacer finger, each tab being moveable between a storage position wherein said finger is outside said line of travel and a stop position wherein said stop finger lies across said line of travel between said abutments; means for selectively maintaining said tabs in said storage position; and means for selectively holding said tabs in said stop position with all adjacent fingers in said stop position stacked along said line such that the pivotal movement of said second abutment toward said first abutment is additively reduced by at least the dimension of each finger positioned across said line.

5. The stop of claim 4 wherein said elongate member is a straight shaft.

6. A steering angle stop for limiting pivotal movement of a steerable wheel pivotally attached to a vehicle body by a wheel support to which said wheel is rotatably attached, said stop comprising: a first abutment fixed relative to said vehicle body; a second abutment fixed relative to said wheel support and having a line of travel intersecting said first abutment as said second abutment is pivoted with said support toward said first abutment; one or more stop tabs pivotally mounted on an elongate member attached to said vehicle, each tab having a spacer finger and each tab being pivotable about said elongate member to a storage position wherein said tab lies outside said line of travel and to a stop position wherein said finger lies across said line of travel' between said abutments; means for selectively holding said tabs in said storage position; and means for holding said tabs in said stop position with all adjacent fingers in said stop position stacked along said line such that the pivotal movement of said second abutment toward said first abutment is additively reduced by at least the dimension of each finger positioned along said path.

7. The stop of claim 6 wherein said shaft is the shank of straight bolt and said bolt provides said means for holding said tabs in position.

8. A steering angle stop for limiting relative pivotal movement between an axle yoke and a knuckle which rotatably supports a steerable wheel of a vehicle, said stop comprising:
(a) a first abutment located on said yoke, said yoke pivotally supporting a knuckle and allowing pivotal movement of said knuckle with respect to said yoke about a generally vertical axis;
(b) a second abutment located on said knuckle having a projected line of travel intersecting said first abutment as said second abutment and knuckle pivot relative to said yoke toward said first abutment;
(c) a series of stop tabs secured to said vehicle, each tab having a spacer finger, a storage position wherein said tab lies outside the line of travel between said abutments and a stop position wherein said finger lies across said line between said abutments and each finger occupies a unique stop position along said line with respect to the other fingers;
(d) means for selectively maintaining one or more of said tabs in said storage position and for selectively maintaining one or more of said tabs in said stop position such that the possible movement of said second abutment toward said first abutment is additively limited by at least the dimension of each finger positioned along said line of travel.

9. The stop of claim 8 wherein said tabs are fixed to said yoke such that said tabs are only capable of movement between said storage and stop positions relative to said yoke and said tabs are stacked progressively outward from said first abutment.

10. The stop of claim 9 wherein means are provided for preventing movement of a tab to a stop position before all tabs inward of said tab have been moved to said stop position.

11. The stop of claim 10 wherein a tab located to the outside of another tab has a prong for engaging the inner tab immediately adjacent thereto when said inner tab is in a storage position and moving said inner tab to a stop position when said relatively outer tab is moved to a stop position.

12. The stop of claim 8 wherein said stop includes an inner tab located between said abutment and an outer tab, said outer tab having a prong projecting therefrom and engageable with the inner tab to prevent movement of the outer to its stop position unless the inner tab is also moved to its stop position.

13. The stop of claim 8 wherein said tabs are mounted on a shaft for pivotal movement with respect thereto into said storage and stop positions.

14. The stop of claim 13 wherein said tabs are pivotally supported about the shank of a bolt and said bolt is tightened to hold said tabs in said storage or stop position.

15. A steering angle stop for limiting pivotal movement between a yoke and a knuckle, supporting a steerable wheel, about a generally vertical axis in a number of discrete increments, said stop comprising:
   (a) a first abutment located on said yoke,
   (b) a second abutment located on said knuckle and positioned to contact said first abutment when said knuckle is pivoted sufficiently in a direction toward said first abutment;
   (c) one or more limit tabs pivotally mounted about a rod fixed relative to one of said abutments, said tabs projecting radially away from said rod, said tabs having a position on said rod for storing said tab outside a line of travel between said first abutment and said second abutment, and a position on said rod wherein said tab crosses said line; and
   (d) means for selectively holding said tabs in said storage position and for selectively holding said tabs in said position across said line thereby restricting pivotal movement of said knuckle with respect to said yoke.

16. The stop of claim 15 wherein said rod comprises a bolt a bolt engaging a threaded hole in said yoke.

17. The stop of claim 16 wherein each tab has a bore extending through one end thereof, the bore rotatably receiving a shank of said bolt.

18. The stop of claim 17 wherein said bolt provides said means for holding said tabs in said storage and stop positions.

* * * * *

UNITED STATES PATENT AND TRADEMARK OFFICE
CERTIFICATE OF CORRECTION

PATENT NO. : 4,660,845

DATED : 28 April 1987

INVENTOR(S) : Herbert William Herr

It is certified that error appears in the above-identified patent and that said Letters Patent is hereby corrected as shown below:

```
Col. 5, line 28, change "step" to -- stop --.
        line 30, after "tab" insert -- , --
Col. 8, line 9, delete "a bolt" (first occurrence).
```

Signed and Sealed this

Second Day of February, 1988

*Attest:*

DONALD J. QUIGG

*Attesting Officer*   *Commissioner of Patents and Trademarks*